: 2,999,096
Patented Sept. 5, 1961

2,999,096
CYANOBENZHYDRYL ETHERS OF AMINO ALCOHOLS
Albert Schlesinger, Jackson Heights, and Samuel M. Gordon, Forest Hills, N.Y., assignors to Endo Laboratories, Inc., Richmond Hill, N.Y., a corporation of New York
No Drawing. Filed May 23, 1957, Ser. No. 661,048
6 Claims. (Cl. 260—294.7)

This invention relates to cyanobenzhydryl ethers. More particularly this invention is directed to cyanobenzhydryl ethers of amino alcohols, their acid addition and quarternary salts, and methods of preparing same.

The compounds of the present invention may be represented by the following general formula:

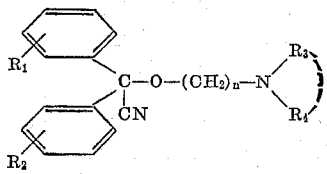

wherein $R_1$ and $R_2$ are members of the group comprising hydrogen or chlorine; $n$ is an integer of the series 2, 3, $R_3$ and $R_4$ when individual radicals are lower alkyl groups, or when linked cyclically form the piperidino, morpholino or pyrrolidino radicals.

It has been found that the compounds of this invention exhibit strong antihistaminic effect as well as substantial anti-cholinergic properties. Furthermore, it has been found that these compounds, unlike other antihistaminic compounds, exhibit a marked tracheo- or broncho-dilator action.

In fact it has been stated that the broncho-constrictor action of all known antihistaminics limits the usefulness of those drugs in counteracting anaphylactic or allergic bronchospasm (Hawkins, D. F., Brit. J. Pharmacol. Chemother. 10, 230 (1955) July).

The new compounds of this invention have therefore a marked advantage over the known compounds with antihistaminic action.

It was further found that the cyano group of these new compounds is exceptionally stable in gastric as well as in intestinal juice. Even after 5 days incubation time, no free CN ions or any other changes could be detected.

The compounds of this invention may generally be prepared by reacting secondary amines, such as dimethylamine, diethylamine, diisopropylamine, di-butylamine, diamylamine, dibenzylamine, piperidine, morpholine, pyrrolidine, methylbenzylamine, ethyl-propylamine, etc., with halo alkyl cyanobenzhydryl ethers without or in presence of inert solvents.

Although the compounds of this invention may be prepared by simply heating the desired reactants together until the desired aminoalkylether is obtained, it is preferred to carry out the reaction in the presence of some solvents, such as methanol, ethanol, benzol, toluol, etc. The particular solvent is not critical since its primary purpose is to permit more efficient interaction of the reactants.

In this reaction, a mole of hydro halogen acid is liberated, so that it is preferred to employ an acid acceptor, such as pyridine, diethylanilines, in organic bases, such as sodium or potassium carbonate, but preferably an excess of the secondary amines.

The intermediate halo alkyl cyanobenzhydryl ethers are prepared and claimed according to pending application Serial No. 519,641, filed July 1, 1955 now Patent No. 2,793,276.

PREPARATION 1

A mixture of 227.5 grams of alpha-chloro diphenyl aceto nitrile, 1,000 grams of ethylene chlorhydrin and 110 grams of potassium bicarbonate is stirred at 35° C.–40° C. for about 36 hours. Then, 1000 cc. of ethyl ether is added thereto with stirring. After standing for 2 hours, the precipitate of potassium chloride is filtered off and washed with ether. The ether and the excess of the ethylene chlorhydrin removed by distillation, and the residual 2-chloroethyl cyanobenzhydryl ether is purified by distillation in vacuo. B.P. $_{1\ mm.}=150°–155°$ C.

PREPARATION 2

A mixture of 227.5 grams of alpha-chloro diphenyl-acetonitrile, 1,000 grams of trimethylenechlorohydrin and 110 grams of sodium bicarbonate is stirred at 35° C.–40° C. for about 40 hours. The mixture is then diluted with 1,000 cc. of ethyl ether; and the precipitated sodium chloride removed by filtration. The ether and the excess trimethylenechlorohydrin are removed from the filtrate by distillation; and the residue then distilled under reduced pressure to obtain the 3-chloro propyl cyanobenzhydryl ether. B.P. $_{1\ mm.}=170°$ C.

PREPARATION 3

A mixture of 113 grams of alpha chloro-p-chloro phenylphenyl-acetonitrile, 200 grams of ethylenechlorohydrin and 60 grams of potassium bicarbonate is stirred at 35°–40° C. for about 36 hours. The mixture is then diluted with 500 cc. of ethyl ether; and the precipitated potassium chloride removed by filtration. The ether and the excess ethylenechlorohydrin are removed by distillation; and the residue distilled with vacuo, to obtain the 2-chloro ethyl-p-chlorophenyl-phenyl-acetonitrile ether. B.P. $_{2mm.}=180°$ C.

The alpha-chloro-p-chlorophenyl-phenyl-acetonitrile here used was prepared by refluxing 115 grams of p-chloro-phenyl-phenyl-aceto-nitrile with 101 grams of phosphorus pentachloride for 3 hours on a steam bath; distilling off the formed POCl₃ and PCl₃, and washing the residue with a CaCO₃ suspension in water. The residue was extracted with benzene; the solution dried and filtered and after evaporation of the benzene, the alpha-chloro-p-chlorophenyl-phenyl-aceto-nitrile distilled under reduced pressure. B.P. $_{4\ mm.}=190°$ C.

The following examples illustrate the preparation of the compounds of this invention:

EXAMPLE 1

*1,1-diphenyl-1-piperidinoethoxy-acetonitrile*

27 grams of 2-chloro-ethyl-cyanobenzhydryl ether and 30 grams of piperidine in 150 cc. of anhydrous benzene are refluxed for 50 hours. The reaction mixture is cooled, filtered, and the benzene evaporated. The residue is extracted with diluted hydrochloric acid and this solution extracted with ether. The hydrochloric acid solution is then alkalinized with sodium hydroxide solution and the precipitated base is extracted with ether. The ether solution is dried, filtered, and the ether evaporated; and the residual oil distilled to yield 1,1-diphenyl-1-piperidino-ethoxy-acetonitrile.

The base dissolved in ether and hydrochloric acid in ether added yielded the crystalline hydrochloride salt of this base. M.P. 187°–188° C.

EXAMPLE 2

*1,1-diphenyl-1-dimethylamino ethoxy-acetonitrile*

81 grams of 2-chloroethyl-cyanobenzhydryl ether and 37 grams of dimethylamine in 150 cc. of methanol are heated in a sealed tube for 6 hours at 90° C. The mixture is cooled, filtered and the methanol evaporated and, following the isolation procedure of Example 1, the cyanobenzhydryl ether of this example is obtained as a viscous oil.

The base dissolved is in ether, and hydrochloric acid in ethanol added thereto, yielded the hydrochloride salt of 1,1-diphenyl-1-dimethylamine ethoxy-aceto nitrile. M.P. 193° C.

5 grams of this base dissolved in 50 cc. of ethyl ether and 5 grams of methyl iodide added yielded, after standing at room temperature for about 48 hours, a white crystalline salt, the quaternary trimethylamino iodide derivative. M.P. 184° C.

EXAMPLE 3

*1,1-diphenyl-1-diethylamino ethoxy-acetonitrile*

54.2 grams of 2-chloroethyl cyanobenzhydryl ether and 50 grams of diethylamine dissolved in 150 cc. ethanol are heated in a sealed tube for 6 hours at 100° C. After cooling, the solution is filtered and the ethanol evaporated. The residue is treated in accordance with the isolation procedure of Example 1. The 1-diethylamino ethoxy derivative of this example is obtained as an oil.

The hydrochloride salt thereof was prepared from the ether solution of the base and hydrochloric acid ethanol solution.

It was recrystallized from isopropanol. M.P. 128° C.

EXAMPLE 4

*1,1-diphenyl-1-pyrrolidino ethoxy-acetonitrile*

54.2 grams of 2-chloroethyl-cyanobenzhydroxy ether and 50 grams of pyrrolidine in 150 cc. ethanol are heated in a sealed tube for 12 hours at 90°. Following the isolation procedure of Example 1, the 1-pyrrolidino ethoxy acetonitrile of this example was obtained as an oil. The hydrochloride salt was obtained from the base and HCl in ether. M.P. 177° C.

EXAMPLE 5

*1,1-diphenyl-1-morpholino ethoxy-acetonitrile*

41 grams of 2-chloroethyl-cyanobenzhydryl ether and 40 grams of morpholine in 150 cc. ethanol are heated in a sealed pressure tube for 12 hours at 90°. Following the isolation procedure of Example 1, the 1,1-diphenyl-1-morpholino ethoxy-acetonitrile of this example was obtained as an oil. By standing at room temperature, this oil crystallized. M.P. 105° C. The hydrochloride salt of this base was crystallized from ethanol and ether. M.P. 193° C.

EXAMPLE 6

*1,1-diphenyl-1-di-n-butylamino ethoxy-acetonitrile*

41 grams of 2-chloro ethyl cyano benzhydryl ether and 50 grams of di-n-butylamine in 150 cc. ethanol are heated in a sealed tube for 12 hours at 100° C. Following the isolation procedure of Example 1, the 1,1-diphenyl-1-di-n-butylamino-ethoxy-aceto nitrile of this example was obtained as an oil. B.P. 180° C. at 1–2 mm.

EXAMPLE 7

*1,1-diphenyl-1-di-n-propylamino ethoxy-acetonitrile*

41 grams of 2-chloroethyl-cyanobenzhydryl ether and 50 grams of di-n-propylamine in 150 cc. ethanol are heated in a sealed tube for 12 hours at 90° C.

Following the isolation procedure of Example 1, the 1-di-n-propylamino ethoxy derivative of this example was obtained as an oil. B.P. 189° at 2–3 mm.

EXAMPLE 8

*1,1-diphenyl-1-pyrrolidino propoxy-acetonitrile*

28.5 grams of 3-chloropropyl-cyanobenzhydryl ether and 25 grams of pyrrolidine in 150 cc. ethanol are heated in a sealed tube for 12 hours at 90° C. Following the isolation procedure of Example 1, the 1,1-diphenyl-1 pyrrolidino propoxy-acetonitrile of this example was obtained as an oil.

The hydrochloride salt of this base could be recrystallized from methyl ethyl ketone. M.P. 162° C.

EXAMPLE 9

*1,p-chlorophenyl-1-phenyl-1-piperidinoethoxy-acetonitrile*

15 grams of 1-p-chlorophenyl-1-phenyl-1-(2-chloroethoxy)-acetonitrile and 20 grams of piperidine in 100 cc. of toluene are refluxed for 24 hours. The reaction mixture, after cooling, was filtered and the toluene evaporated. Following the isolation procedure of Example 1, the 1 - p-chlorophenyl-1-phenyl-1-piperidinoethoxy-acetonitrile of this example was obtained as an oil.

The hydrochloride salt of this base was isolated from isopropanol and ether. M.P. 153° C.

EXAMPLE 10

*1-p-chlorophenyl-1-phenyl-1-pyrrolidinoethoxy-acetonitrile*

30 grams of 1-p-chlorophenyl-1-phenyl-1-(2-chloroethoxy) aceto-nitrile and 20 grams of pyrrolidine in 150 cc. ethanol are heated in a sealed pressure tube for 12 hours at 90° C. After cooling, the mixture was filtered, and the ethanol was evaporated. The residue was extracted with diluted HCl solution and, following the isolation procedure of Example 1, the 1-p-chlorophenyl-1-phenyl-1-pyrrolidinoethoxy-acetonitrile of this example was obtained as an oil. B.P. 205–210° C. at 2 mm.

The hydrochloride salt of this compound was obtained by dissolving the base in ethyl ether, adding HCl in ethanol until it showed acid reaction to Congo red, evaporating the solvents, and recrystallizing the salt from acetone and ether. M.P. 165° C.

EXAMPLE 11

*1,p-chlorophenyl-1-phenyl-1-dimethylamino ethoxy-acetonitrile*

30 grams of 1-p-chlorophenyl-1-phenyl-1-(2-chloroethoxy)-acetonitrile and 13 grams of dimethylamine in 150 cc. methanol are heated for 6 hours at 90° C. The cooled solution was filtered, the methanol evaporated. Following the isolation procedure of Example 1, the 1-p-chlorophenyl-1-phenyl-1-dimethylaminoethoxy-aceto nitrile of this example was obtained as an oil. B.P. 195–200° C. at 2–3 mm.

The hydrochloride salt was recrystallized from ethanol and ether. M.P. 173.5° C.

It will be understood that the foregoing description of the invention and the examples set forth are merely illustrative of the principles thereof. Accordingly, the appended claims are to be construed as defining the invention within the full spirit and scope thereof.

We claim:

1. A member of the group consisting of compounds of the formula:

$$R_1-\phi\phi-\underset{CN}{\overset{|}{C}}-O-(CH_2)_n-N\underset{R_4}{\overset{R_3}{\diagup}}$$
$$R_2-\phi\phi$$

and the pharmaceutically acceptable acid addition salts thereof wherein: $R_1$ and $R_2$ are members of the group consisting of hydrogen and chlorine, $n$ is an integer of 2 to 3, $R_3$ and $R_4$ are members of the group consisting of: lower alkyl and when taken together constitute the terminal ends of a member of the group consisting of —(CH$_2$)$_4$—, —(CH$_2$)$_5$— and —(CH$_2$)$_2$—O—(CH$_2$)$_2$—.
2. 1,1-diphenyl-1-piperidinoethoxy-aceto nitrile.
3. 1,1-diphenyl-1-dimethylamino ethoxy-acetonitrile.
4. 1,1-diphenyl-1-pyrrolidino ethoxy-acetonitrile.
5. 1 - p - chlorophenyl-1-phenyl-1-pyrrolidinoethoxy-acetonitrile.
6. 1-p-chlorophenyl-1-phenyl-1-dimethylamino ethoxy-acetonitrile.

References Cited in the file of this patent
UNITED STATES PATENTS 2,851,458 Billinghurst _____ Sept. 9, 1958

FOREIGN PATENTS 652,748 Great Britain _____ May 2, 1951
677,522 Great Britain _____ Aug. 20, 1952
743,043 Great Britain _____ Jan. 4, 1956